May 1, 1945.  C. C. MINTER  2,374,945

PRESSURE MEASURING APPARATUS

Filed July 26, 1943   3 Sheets-Sheet 1

INVENTOR
CLARKE C. MINTER.
BY
ATTORNEY

May 1, 1945.  C. C. MINTER  2,374,945
PRESSURE MEASURING APPARATUS
Filed July 26, 1943  3 Sheets-Sheet 2

INVENTOR
CLARKE C. MINTER.
BY
ATTORNEY

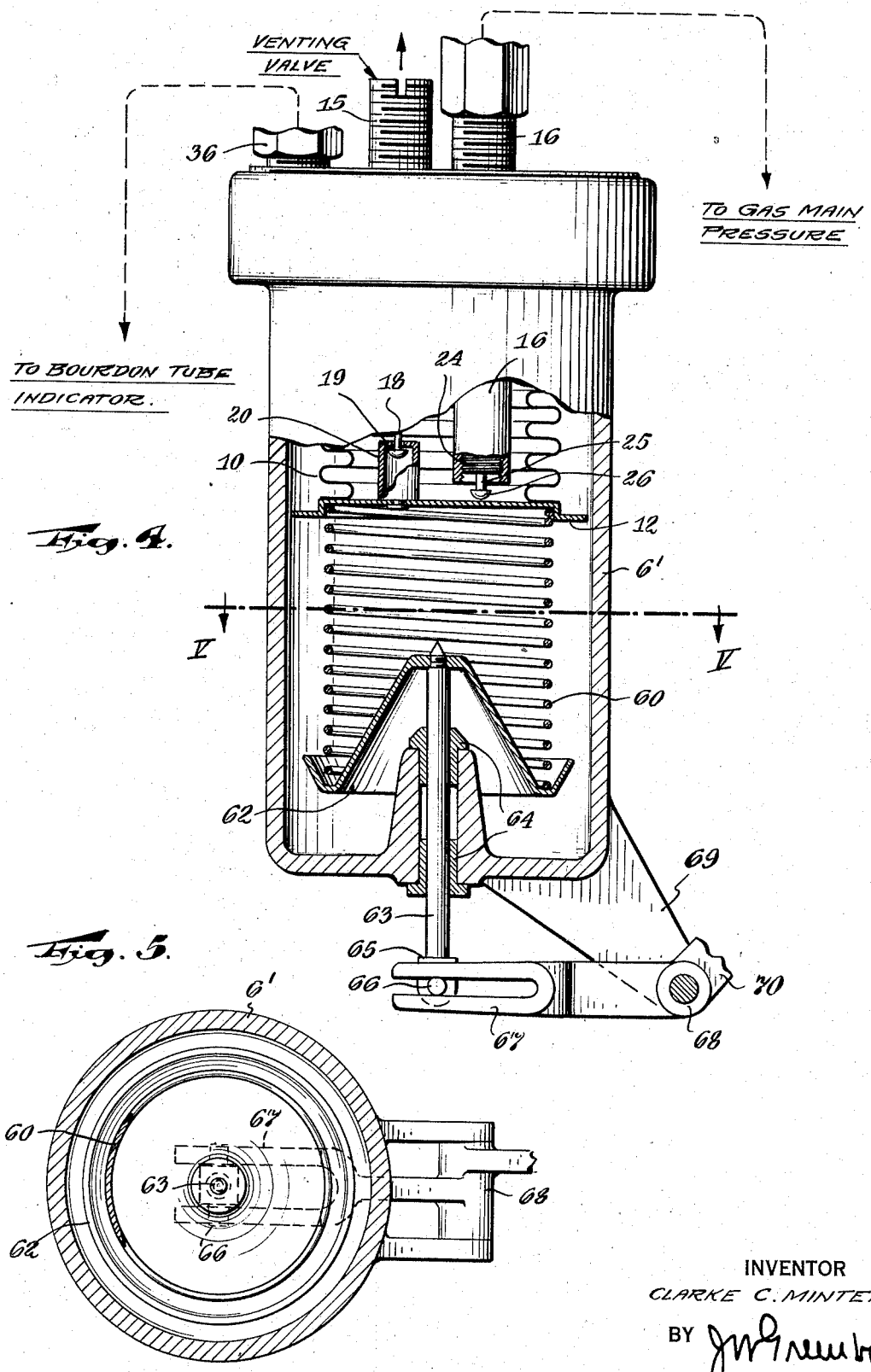

Patented May 1, 1945

2,374,945

UNITED STATES PATENT OFFICE 2,374,945

PRESSURE MEASURING APPARATUS

Clarke C. Minter, East Orange, N. J., assignor to Bulova Watch Company, New York, N. Y., a corporation of New York Application July 26, 1943, Serial No. 496,116

15 Claims. (73—406)

The present invention relates to pressure indicator apparatus and particularly to a mechanical apparatus of a relatively simple and economical construction capable of operation with a high degree of accuracy.

More specifically the invention embodies an arrangement of co-related elements operating to indicate the degree of variation in pressure, such as in fuel or oil pressure systems for engines, especially when used on airplanes of the multi-motored type wherein the engines are positioned relatively great distances from the instrument board in the pilot's cabin where the indicator must be located.

The principle of operation on which the present invention is based, may be applied to other uses in industry. It may for example be used to indicate the level of a liquid by registering in response to the pressure or head of a body of liquid by utilizing the variations in degree of pressure to actuate means for indicating the liquid level. Furthermore the invention contemplates the automatic regulation or control of a condition such as a liquid level, by utilizing the effect of the change in the applied force resulting from change in pressure by translating such change in force to means for operating liquid level or other control apparatus or for performing other mechanical operations.

An object of the present invention is therefore to provide a device for utilizing the variations in the degree of an applied force and to translate such variations in force into corresponding variations in the degree of movement of indicating or other mechanism.

Another object of the invention is to provide a remote indicator apparatus of simple and rugged construction for use on airplanes where an indicator is required remote from the pressure system.

Another object of the invention is to provide a compact and effective device for industrial use wherein a condition may be indicated or controlled such for example as the condition of a liquid level.

Another object of the invention is to provide an indicator for registering the condition of an applied force, such for example as produced by the position of a selected or provided part of an airplane when subjected to wind pressure.

Another object of the invention is to provide an apparatus whereby variations in the degree of an applied force may be indicated at relatively great distances by means of an attenuated column of fluid responsive to changes in degree of the applied force, and also in utilizing the responsive action of the column to control other mechanism.

Another object of the present invention is the provision of a mechanical pressure indicator apparatus which is readily accessible at all times for replacement and repair.

A further object of the present invention is the provision of a mechanical pressure indicator apparatus wherein the pressure of a liquid to be measured is transmitted to a harmless gas and communicated any desired distance to an appropriate pressure indicator gauge.

Still further objects of the present invention will become obvious to those skilled in the art by reference to the accompanying drawings wherein:

Fig. 4 is a view similar to that of Fig. 1 but showing the control member portion slightly modified for the purpose of indicating in the pilot's cabin the particular position of some part of the airplane controls;

Fig. 5 is a sectional view taken on the line V—V of Fig. 4.

Figure 1:
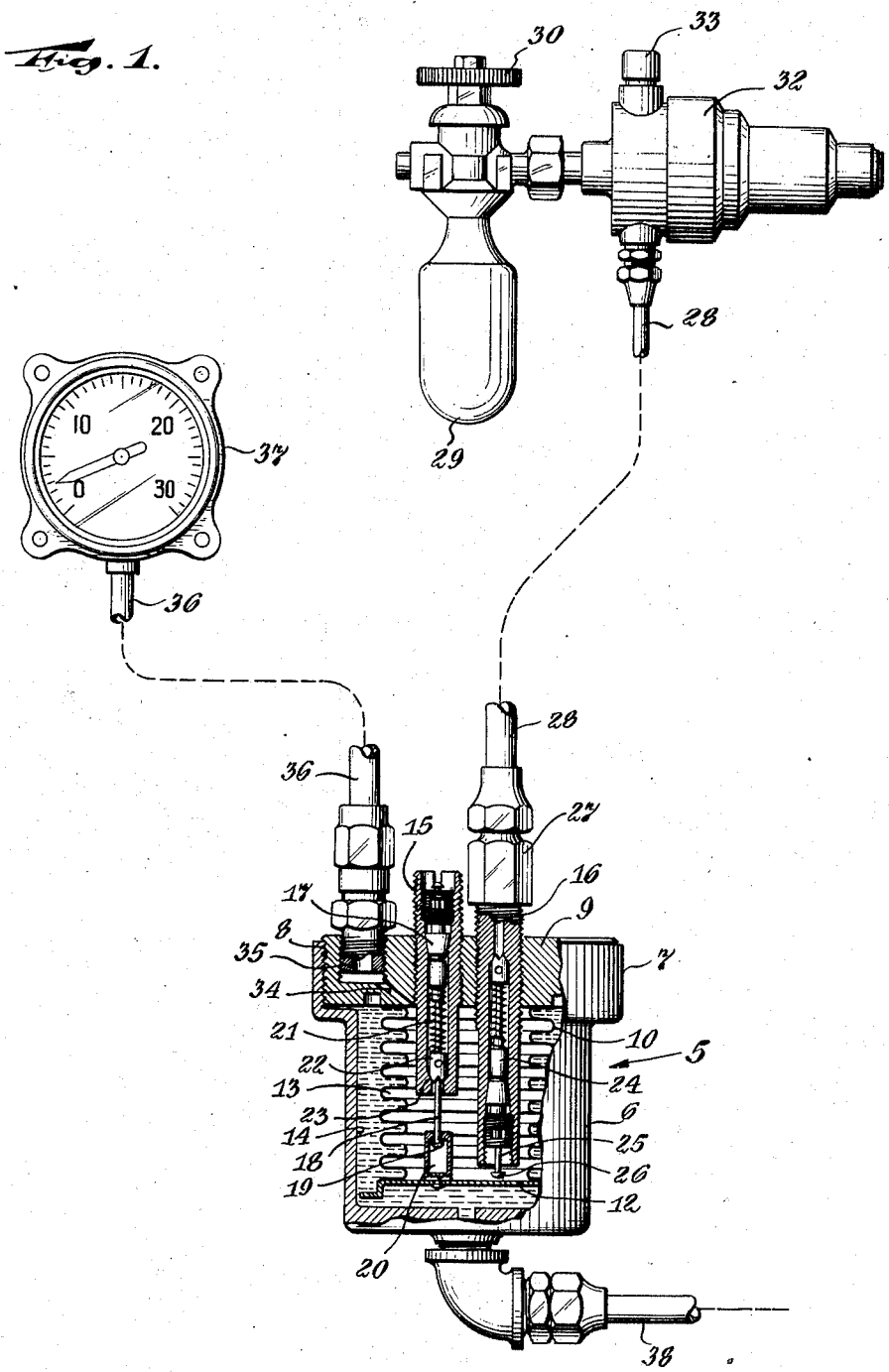
Fig. 1 is a fragmentary view partly in cross-section of the complete remote indicator apparatus of the present invention.

Referring now to the drawings in detail a practical embodiment of the invention may include what is termed a transmitter unit 5 consisting of a hollow casing 6 provided with a flange portion 7 of slightly larger diameter than the casing 6 which is threaded internally at 8. A closure member or head 9 threadedly engages the flange portion 7 of the casing 6. Secured to the underside of this head 9 and having one end closed thereby in a fluid tight manner is a metallic bellows 10. The opposite end of the bellows 10 is closed by a plate 12 which constitutes a movable member or valve actuating element as will be hereinafter described. Thus two separate chambers are provided within the casing 6, one such chamber 13 being the interior of the metallic bellows 10 and the other chamber 14 constituting the space completely around the exterior of the bellows 10 between the latter and the wall of casing 6.

A pair of threaded tubes or valve housings 15 and 16 pass through the head 9 and extend downwardly of the chamber 13 with their depending ends being positioned in spaced relation to the movable member or plate 12 of the metallic bellows 10. Threadedly engaging the tube 15 is a pressure valve 17 of any suitable standard construction modified for the present purpose. This valve is provided with a projecting stem 18 having a head 19 spaced a selected distance, preferably a few thousands of an inch, in the present construction, from the underside of an end wall or plate of a hollow sleeve or stop-member 20, which is rigidly secured to and movable with the plate 12. A spring 21 of valve 17 is affixed to a collar 22 which bears against a shoulder 23 in the tube 15 so that the spring maintains the valve closed. The stem 18 which controls the valve is so disposed that the head 19 is not in contact with the end of the sleeve 20 but normally in the spaced relation above mentioned and for a purpose hereafter more fully stated. The valve 17 is in the present embodiment of the invention, an outlet valve and when the stem 18 is moved downwardly the valve opens the chamber 13 to the atmosphere.

The tube 16 is provided with an inlet valve 24 of any standard make modified for the present use, having a stem 25, the head 26 of which is spaced a predetermined distance, preferably a few thousandths of an inch, in the present construction, from the plate 12. As shown, the tube 16 is provided with a suitable coupling 27 allowing connection of a conduit 28, which extends to a source 29 of gas under pressure, such as compressed or liquefied carbon dioxide, under control of a hand valve 30. Inasmuch as this source of gas 29 is at a pressure far in excess of that required for the input of the transmitter unit 5 a suitable reducing valve 32 is provided which has the usual vent valve 33 to prevent damage to the system. The pressure of fluid admitted to chamber 13 may be selected and sufficiently in excess of the pressure or force to be indicated.

The head 9 is provided with a passageway 34 communicating with the chamber 13 and extending to an outlet port 35 which communicates through a conduit 36 with an indicator gauge 37 calibrated in pounds pressure, degrees of angle or any other desired indicia, or if desired a simple upper and lower limit indicator may be employed.

When it is desired to indicate the variations in degree of the pressure of an oil system, for example, the liquid whose pressure is to be measured is introduced into the chamber 14 of the transmitter unit 5 through a conduit 38 which is of minimum length so as to place the transmitter in close proximity to the engine.

In operation the hand valve 30 is opened to admit gas to the conduit 28 preparatory to entering the chamber 13. The liquid whose pressure is to be measured is then admitted into the chamber 14. The pressure of the liquid causes the plate 12 to move and engage stem 25 opening the valve 24 admitting the fluid which equalizes the pressures in the two chambers causing the plate 12 to move away from the stem 25 permitting valve 24 to close. Thereafter the chamber 13 which may be termed a compensating chamber is ready for further equalizing operations in accordance with variations in degree of pressure of the liquid. Input pressures for the transmitter 5 from the source 29 may range approximately 220 pounds per square inch for oil pressure indication and 35 pounds per equare inch for fuel pressure indication. Consequently, the pressure of gas from the source 29 may be predetermined to equalize or substantially equalize the pressure of the liquid introduced into the chamber 14. When the fluid has entered the compensating chamber 13 and equalized the pressures, both valves 17 and 24 will be closed and their respective valve stem heads 19 and 26 spaced a few thousandths of an inch from the end of sleeve 20 and the plate 12 respectively. The stem 18 (of valve 17) and stem 25 (of valve 24) disposed in close or operative relation to the flexible member which carries and causes reciprocal movement of plate 12 may be termed valve-actuating members since a movement of these stems upon a movement of said plate controls the operation of the valves.

Should the pressure of the liquid to be measured in the chamber 14 increase, the bellows 10 contracts slightly thus bringing the plate 12 into contact with the head 26 of valve stem 25 causing the inlet-valve 24 to open and admit gas from the source 29. Flow of gas will continue into compensating-chamber 13 until the increased pressure equals that of the liquid in the chamber 14 at which time the plate 12 moves to its initial position permitting valve 24 to close. The increased gas pressure in the chamber 13 required to again expand the bellows 10 and equalize the pressure in both chambers 13 and 14 is accordingly indicated on the gauge 37 since the latter is in direct communication with the chamber 13. Moreover, the conduit 36, which may extend from the transmitter unit 5 disposed adjacent the engine a considerable distance to the pilot's cabin, may be of extremely small cross sectional area and carries only a harmless gas such as $CO_2$ or it may be compressed air generated by a pump operated by the engine.

Upon a decrease of pressure in the chamber 14 the bellows 10 will expand slightly and this causes the plate 12 together with its integral sleeve 20 to move pulling on the head 19 of valve stem 18 and opening outlet valve 17. Opening of this latter valve allows the gas within the chamber 13 to be exhausted to the atmosphere through tube 15. This decreases the pressure in the chamber 13 until it is substantially equal to that within the chamber 14 again allowing the bellows 10 to contract until the valve 17 closes preventing further venting of gas from the chamber 13 and such change in pressure being indicated on the gauge 37.

The transmitter unit 5 is accordingly very sensitive to small pressure changes which are indicated very accurately by the pressure gauge 37. Moreover, since there is a slight clearance of a few thousandths of an inch between the plate 12 functioning as a diaphragm and the valve stems 18 and 25, the valves are entirely free and independent of wall of the chamber 13 and the unit operates with precision and with an entire absence of chattering or "hunting," heretofore a common fault in pressure indicating systems.

Figure 2:
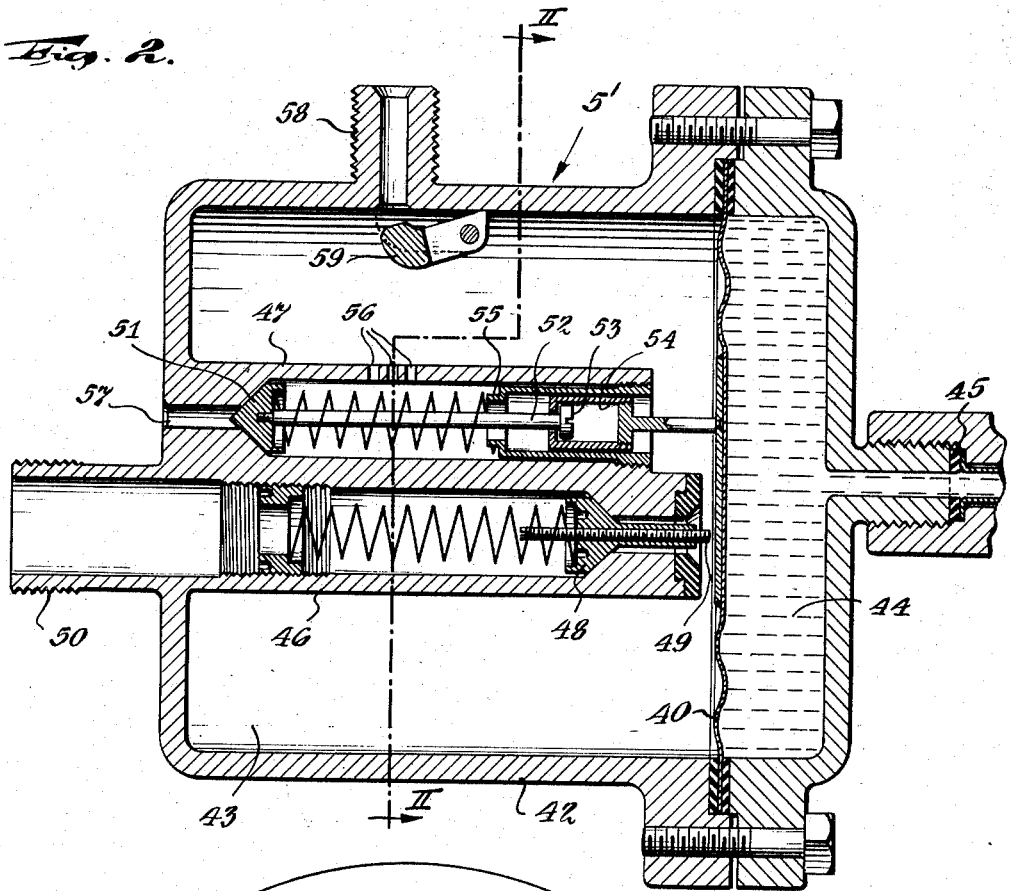
Fig. 2 is a sectional view on an enlarged scale of a modification which the control member portion of the remote indicator apparatus of the present invention may take.
Figure 3:
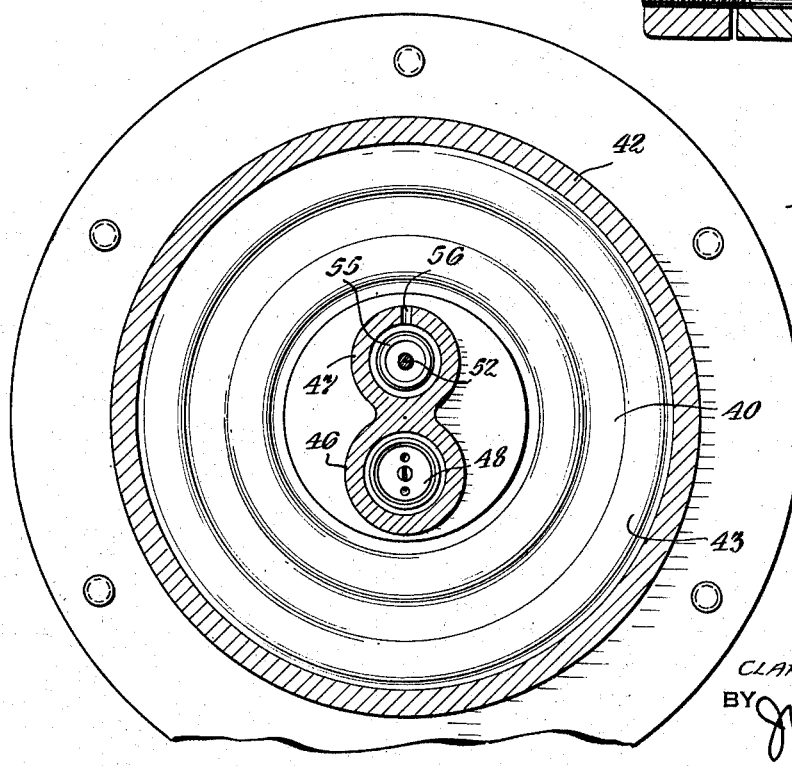
Fig. 3 is a sectional view taken on the line II—II of Fig. 2.

Figs. 2 and 3 show a modification of the transmitter unit of the present invention which differs from that previously described only in details of construction. For example, in Fig. 2 the transmitter unit 5' of this modification is provided with a flexible diaphragm 40 which again divides the casing 42 into two chambers 43 and 44. The liquid to be measured is admitted into the chamber 44 through an inlet 45 extending from a given source such as an engine in the same manner as previously described relative to the conduit 38 of Fig. 1.

The casing 42, Fig. 2, is again provided with a pair of tubes 46 and 47, one of which 46 is provided with a valve 48 having a threaded adjustable stem 49 with its free end in close relation to the diaphragm or movable-member 40. It has been found that in the present embodiment of the invention the allowance of a space of a few thousandths of an inch between the ends of the valve stem and the diaphragm 40 is satisfactory. The tube 46 is provided with an added extension 50 to connect the tube 46 to a source of gas and the valve 48 operates in the same manner as valve 24 of Fig. 1 which controls the flow of gas into chamber 13. Tube 47 is likewise provided with a valve 51 having a stem 52 provided with a head 53. As shown, this head 53 terminates in close space relation, preferably a few thousandths of an inch, from the rear surface of one end of yoke member 54, which member reciprocates in a sleeve 55. The yoke 54 is provided with an extension member connected to and movable with the movable-member or diaphragm 40. The tube 47 is provided with a plurality of ports 56 communicating with chamber 43 and with a vent passageway 57 exhausting to the atmosphere.

The modification shown in Figs. 2 and 3 operates in the identical manner as that of Fig. 1. In other words gas from a suitable source, such as 29 of Fig. 1, enters the chamber 43 by means of valve 48 when the member 40 moves toward the valves under an increase in pressure of the liquid to be measured within the chamber 44 and actuates valve stem 49. Similarly, when the pressure of the liquid in the chamber 44 decreases the diaphragm flexes to the right. This movement pulls on the yoke member 54 which then in turn pulls on the head 53 of the stem 52 opening valve 51. Opening of this valve 51 allows the gas within the chamber 43 to be vented to the atmosphere through ports 56 and passageway 57 again substantially equalizing the pressures in the two chambers 43 and 44 and bringing the diaphragm 40 to rest. Since the casing 42 may be connected by a tubular connection or outlet 58 to a Bourdon gauge similar to that shown in Fig. 1, pressure changes occurring within the transmission unit 5' are indicated on the gauge 37. In this particular embodiment the transmission unit 5' is provided with a small pivoted float valve 59 which closes the outlet 58 leading to the gauge 37 in the event the diaphragm 40 should disrupt allowing the liquid from the chamber 44 to enter chamber 43, thus preventing such liquid to flow through the conduit of the indicator.

The modification shown in Figs. 4 and 5 is substantially the same as that shown in Fig. 1 but differs from the latter in certain constructional details to adapt the transmission unit to the measurement or indication of the position of mechanical elements. Inasmuch as the valve structure and all parts communicating with the inner chamber within the bellows 10 are identical to that previously described relative to Fig. 1 reference may be had to such figure and the description of the modification of Figs. 4 and 5 will be limited to constructional differences.

Instead of liquid whose pressure is to be measured being admitted to the outer chamber 14 (as in Fig. 1) the chamber provided by the casing 6' is provided with a calibrated spring 60, i. e. under a preselected tension, exerting a force against the movable-member or plate 12 and against a flanged conical collar or the like 62. A shaft 63 is connected at one end to the collar 62 and passes through a pair of bearings 64 to the exterior of the casing 6' and the opposite or free end of shaft 63 is provided with a head 65 having a transverse pin 66. A bifurcated yoke-arm 67 extends from a hub 68 pivoted in a suitable bracket 69 integral with the casing. The yoke-arm 67 is arranged to slidably engage the transverse pin 66. This yoke-arm forms part of a linkage such as a crank member 70 extending to any mechanical apparatus such, for example, as the wing flaps or stabilizer of an airplane or to an element subjected to wind pressure and whose particular angle or condition it may be desired to indicate in the pilot's cabin. For this purpose the spring 60 is calibrated so that under a preselected tension and with gas in the inner chamber 13 under a given pressure the bellows 10 and its integral plate 12 are at substantial equilibrium when the controls are in a neutral position or in the absence of wind or other pressure, so that the Bourdon tube indicator in the pilot's cabin shows zero angle.

If now the pilot changes the angle of his flaps or stabilizer this will cause an oscillation of the yoke member 67 about its pivot 68 and a raising or lowering of the shaft 63 since the latter is engaging the yoke through the pin 66. Assuming the shaft 63 is raised then the spring 60 will be compressed as will the bellows 10. Gas will accordingly be admitted into the chamber 13 by opening of the valve 24 until the bellows 10 is again expanded to equalize the pressure exerted by the spring 60.

When the controls are returned to neutral the shaft 63 will lower to its original position with only the preselected pressure being exerted by spring 60 on plate 12.

Since the distance between the ends of the spring 60 varies with the force applied to the spring or, to state it another way, the compression of the calibrated spring 60 varies with the force applied thereto by movement of the shaft 63, the Bourdon tube gauge can be calibrated to read the compression on the spring or linear movement of the free end of the spring and thus transpose into angular movement of any mechanical apparatus such as the flaps or stabilizer of an airplane. Thus it is only necessary for the pilot to glance at his instrument panel and he can immediately discern the precise angle at which his controls are set or if equipped with an element subjected to wind pressure the speed of the airplane may be indicated.

It thus should become obvious to those skilled in the art that a remote indicating system is herein provided which is simple and economical to manufacture and exceptionally precise and accurate in operation. Moreover, the device can be readily employed to indicate in the pilot's cabin the exact pressure of the oil or fuel supply to a remotely located motor, or the particular angle of a mechanical control member without in any way presenting a hazard to the safety of the airplane or pilot nor materially increasing the dead load of the airplane.

Moreover, the apparatus herein shown and described can be readily utilized as a remote liquid level indicator since it measures hydrostatic pressure thus adapting the system to fuel storage tanks, reservoirs, and the like.

Although several embodiments of the present invention have been shown and described it is to be understood that still further modifications thereof may be made without departing from the spirit and scope of the appended claims.

I claim:

1. An apparatus for remotely indicating the condition of means at a given location comprising a casing, a movable member normally at equilibrium and dividing said casing into a pair of chambers, means connected to one of said chambers to cause movement of said member upon a slight change in the condition of the means at a given location, a source of fluid pressure adapted to be admitted to the other of said chambers, means to cause fluid pressure in said other chamber to be exhausted therefrom, means normally spaced from said member but engageable by the latter to automatically cause fluid pressure from said source to be admitted into said other chamber or fluid pressure to be exhausted therefrom depending upon the direction of movement of said member in response to a change in the condition of the means at a given location to maintain said member at equilibrium and in a substantially fixed position in said casing, and an indicator connected to said other chamber and remotely located relative to said casing for measuring at any desired distance the fluid pressure in said other chamber as a measurement of the condition of said means at the given location.

2. An apparatus for remotely indicating the condition of means at a given location comprising a casing, a movable member normally at equilibrium and dividing said casing into a pair of chambers, means connected to one of said chambers to cause movement of said member upon a slight change in the condition of the means at the given location, a source of fluid pressure adapted to be admitted to the other of said chambers, an outlet from said other chamber adapted to exhaust fluid pressure therefrom, a pair of valves normally in spaced relation to said member but engageable thereby to automatically cause one of said valves to open and admit fluid pressure from said source into said other chamber or the other of said valves to open and exhaust fluid pressure from said other chamber depending upon the direction of movement of said member in response to a change in the condition of said means at the given location to maintain said member at equilibrium and in a substantially fixed position in said casing, and an indicator connected to said other chamber and remotely located relative to said casing for measuring at any desired distance the fluid pressure in said other chamber as a measurement of the condition of said means at the given location.

3. A pressure measuring apparatus comprising a casing, a movable member normally at equilibrium and dividing said casing into a fluid pressure chamber and a liquid pressure chamber, a source of fluid under pressure communicating with said fluid pressure chamber, a liquid whose slight pressure change is to be measured in said liquid pressure chamber, means normally disposed in spaced relation to said member but engageable therewith upon the slightest movement of said member and operable by movement of the latter to automatically admit fluid from said source into said fluid pressure chamber or to exhaust fluid therefrom to increase or decrease the pressure in said fluid pressure chamber until equilibrium is established with that of the pressure of the liquid in said liquid pressure chamber, upon the slightest alteration of the latter, and an indicator gauge connected to said fluid pressure chamber for measuring the degree of variation in said fluid pressure chamber in accordance with the slightest degree of variation in said liquid pressure chamber.

4. A pressure measuring apparatus comprising a casing, a movable member normally at equilibrium and dividing said casing into a chamber containing fluid under pressure and a chamber containing liquid whose pressure is to be measured, a source of fluid under constant high pressure adapted to be admitted to said fluid pressure chamber, said fluid pressure chamber having an outlet to the atmosphere, means normally spaced from said member and operable by movement thereof in response to the slightest changes of pressure in said liquid pressure chamber to establish communication between said fluid pressure chamber and either said high pressure source or the atmosphere depending upon the direction of movement of said member to cause equalization of the pressures in both of said chambers and the maintenance of said movable member at equilibrium, and an indicator gauge connected to said fluid pressure chamber for measuring the pressure of the liquid in said liquid pressure chamber.

5. A pressure measuring apparatus comprising a casing, a yieldable member normally at equilibrium and dividing said casing into a pair of chambers, means for admitting the liquid whose pressure is to be measured into one of said chambers, a source of fluid pressure, means for admitting said fluid pressure into the other of said chambers including a valve normally in spaced relation to said yieldable member and operable by movement of the latter in one direction to admit said fluid pressure into said other chamber until the pressure therein equals that of the liquid in the remaining chamber with attendant opposite movement of said yieldable member to equilibrium position accompanied by closure of said valve, an exhaust valve normally in spaced relation to said yieldable member and operable by opposite movement of said member upon a decrease in pressure of the liquid in the one of said chambers to reduce the fluid pressure in the other of said chambers until it equals the decreased pressure of the liquid and said yieldable member again reaches equilibrium position, and an indicator gauge connected to said other chamber for measuring the fluid pressure therein.

6. A pressure measuring apparatus comprising a casing, a flexible member normally at equilibrium position and dividing said casing into a chamber containing fluid under pressure and a chamber containing liquid whose pressure is to be measured, a source of fluid under constant selected pressure adapted to be admitted to said fluid pressure chamber, said fluid pressure chamber having an outlet to the atmosphere, a pair of spring pressed valves normally in spaced relation to said flexible member and operable by movement of the latter in response to the slightest changes of pressure in said liquid pressure chamber to cause one of said valves to establish communication between said fluid pressure chamber and said selected pressure source or the other of said valves to establish communication between said fluid pressure chamber and the atmosphere depending upon the direction of movement of said flexible member for the purpose of equalizing the pressures in both of said chambers and maintaining said flexible member in equilibrium position, and an indicator gauge connected to said fluid pressure chamber for measuring at a predetermined desired distance the pressure of the liquid in said liquid pressure chamber.

7. A pressure measuring apparatus comprising a casing, a flexible member normally at equilibrium position and closing a portion of said casing to form a fluid chamber, a liquid pressure chamber in said casing, means for subjecting said member to a liquid within said liquid pressure chamber whose pressure is to be measured to cause movement of said flexible member in accordance with changes in pressure of said liquid, a source of fluid pressure adapted to be admitted to said fluid chamber, an outlet from said fluid chamber, a pair of valves, means for supporting said valves in said casing adjacent to one side of said flexible member and normally spaced relative thereto, one of said valves being engageable by said flexible member upon movement thereof in one direction in response to an increase in the pressure of said liquid to cause the admission of fluid pressure from said source into said fluid chamber and an equalization of the pressures of said fluid and liquid with maintenance of said flexible member at equilibrium position, the other of said valves being engageable by movement of said flexible member in the other direction in response to a decrease in the pressure of said liquid to reduce the fluid pressure until the liquid and fluid pressures are again equalized and said flexible member is again maintained at equilibrium position, and an idicator gauge connected to said fluid chamber for measuring at a predetermined distance from said casing, the fluid pressure in said fluid chamber as a measurement of the pressure of said liquid.

8. A pressure measuring apparatus comprising a casing, a head closing one end of said casing, an inlet for pressure fluid at the other end of said casing, a movable member in said casing and dividing said casing into a chamber for said pressure fluid and a second chamber for a compensating pressure fluid, an inlet valve for said compensating pressure fluid carried by said head and extending into said second chamber, an outlet valve for said second chamber carried by said head and extending into said second chamber, a stem for said inlet valve normally in close spaced relation to said movable member for engagement thereby upon a movement of said movable member in one direction in response to a variation in pressure of said fluids to actuate said inlet valve, a stem for said outlet valve normally in close spaced relation to said movable member for engagement thereby upon movement of said movable member in an opposite direction in response to variation in pressure of said fluids, and means for indicating the variation in pressure of said fluids.

9. A pressure measuring apparatus comprising a casing, a head closing one end of said casing, an inlet for pressure fluid at the other end of said casing, a flexible member in said casing and dividing said casing into a chamber for said pressure fluid and a second chamber for a compensating pressure fluid, an inlet valve for said compensating pressure fluid carried by said head and extending into said second chamber, an outlet valve for said second chamber carried by said head and extending into said second chamber, a stem for said inlet valve normally in close spaced relation to said flexible member for engagement thereby upon a movement of said flexible member in one direction in response to a variation in pressure of said fluids to actuate said inlet valve, a stem for said outlet valve normally in close spaced relation to said flexible member for engagement thereby upon movement of said flexible member in an opposite direction in response to variation in pressure of said fluids, and means for indicating the variation in pressure of said fluids.

10. A pressure measuring apparatus comprising a casing, a head closing one end of said casing, an inlet for pressure fluid at the other end of said casing, a flexible member in said casing and dividing said casing into a chamber for said pressure fluid and a second chamber for a compensating pressure fluid, an inlet valve for said compensating pressure fluid carried by said head and extending into said second chamber, an outlet valve for said second chamber carried by said head and extending into said second chamber, and disposed in parallel relation to said inlet valve, a stem for said inlet valve normally in close spaced relation to said flexible member for engagement thereby upon a movement of said flexible member in one direction in response to a variation in pressure of said fluids to actuate said inlet valve, a stem for said outlet valve normally in close spaced relation to said flexible member for engagement thereby upon movement of said flexible member in an opposite direction in response to variation in pressure of said fluids, and means for indicating the variation in pressure of said fluids.

11. A pressure measuring apparatus comprising a casing, a head closing one end of said casing, an inlet for pressure fluid at the other end of said casing, a movable member in said casing and dividing said casing into a chamber for said pressure fluid and a second chamber for a compensating pressure fluid, an inlet valve for said compensating pressure fluid, a tubular housing for said inlet valve carried by said head and extending into said second chamber, an outlet valve for said second chamber, a tubular housing for said outlet valve carried by said head and extending into said second chamber and disposed in parallel relation to the housing of said inlet valve, a stem for said inlet valve normally in close spaced relation to said movable member for engagement thereby upon a movement of said movable member in one direction in response to a variation in pressure of said fluids to actuate said inlet valve, a stem for said outlet valve normally in close spaced relation to said movable member for engagement thereby upon movement of said movable member in an opposite direction in response to variation in pressure of said fluids, and means for indicating the variation in pressure of said fluids.

12. A pressure measuring apparatus comprising a casing, a head closing one end of said casing, an inlet for pressure fluid at the other end of said casing, a movable member in said casing and dividing said casing into a chamber for said pressure fluid and a second chamber for a compensating pressure fluid, an inlet valve for said compensating pressure fluid carried by said head and extending into said second chamber, an outlet valve for said second chamber carried by said head and extending into said second chamber, a stem for said inlet valve normally in close spaced relation to said movable member for engagement thereby upon a movement of said movable member in one direction in response to a variation in pressure of said fluids to actuate said inlet valve, a stem for said outlet valve normally in close spaced relation to said movable member for engagement thereby upon movement of said movable member in an opposite direction in response to variation in pressure of said fluids, an indicator, and a conduit for the passage of pressure fluid to said indicator, in response to changes in degree of pressure of said pressure fluid.

13. A pressure measuring apparatus comprising a casing, a head closing one end of said casing, an inlet for pressure fluid at the other end of said casing, a flexible chamber for compensating pressure fluid having one end closed by said head and the other end closed by a movable plate member, an inlet valve for admitting compensating fluid into said flexible chamber, said inlet valve having valve actuating means positioned to be actuated by said plate when the latter is moved under force exerted by said pressure fluid, an outlet valve for the discharge of compensating fluid from said flexible chamber, said outlet valve having valve actuating means positioned to be actuated by said plate when the latter is moved under force exerted by said compensating fluid and means for indicating variations in the degree of pressure of said fluids.

14. A pressure measuring apparatus comprising a casing, a head closing one end of said casing, an inlet for pressure fluid at the other end of said casing, a flexible chamber for compensating pressure fluid having one end closed by said head and the other end closed by a movable plate member, an inlet valve for admitting compensating fluid into said flexible chamber, a stem for said inlet valve positioned to be actuated by said plate when the latter is moved under force exerted by said pressure fluid, an outlet valve for the discharge of compensating fluid from said flexible chamber, a stem for said outlet valve positioned to be actuated by said plate when the latter is moved under force exerted by said compensating fluid, and means for indicating variations in the degree of pressure of said fluids.

15. A pressure measuring apparatus comprising a casing, a head closing one end of said casing, an inlet for pressure fluid at the other end of said casing, a flexible chamber for compensating pressure fluid having one end fixed in said casing and having a movable plate member at the other end, an inlet valve for admitting compensating fluid into said flexible chamber, said inlet valve having valve actuating means positioned to be actuated by said plate when the latter is moved in one direction under force exerted by said pressure fluid, an outlet valve for the discharge of compensating fluid from said flexible chamber, said outlet valve having actuating means positioned to be actuated by said plate when the latter is moved in an opposite direction under force exerted by said compensating fluid, and means for indicating variations in the degree of pressure of said fluids.

CLARKE C. MINTER.